United States Patent
Qiao

(10) Patent No.: US 10,027,414 B2
(45) Date of Patent: Jul. 17, 2018

(54) BIDIRECTIONAL AMPLIFIER

(71) Applicant: Lijie Qiao, Ottawa (CA)

(72) Inventor: Lijie Qiao, Ottawa (CA)

( * ) Notice: Subject to any disclaimer, the term of this patent is extended or adjusted under 35 U.S.C. 154(b) by 0 days.

(21) Appl. No.: 15/453,171

(22) Filed: Mar. 8, 2017

(65) Prior Publication Data

US 2017/0272159 A1    Sep. 21, 2017

Related U.S. Application Data

(60) Provisional application No. 62/308,301, filed on Mar. 15, 2016.

(51) Int. Cl.
*H04J 14/02* (2006.01)
*H04B 10/25* (2013.01)

(52) U.S. Cl.
CPC .......... *H04B 10/2503* (2013.01); *H04J 14/02* (2013.01)

(58) Field of Classification Search
CPC .... H04J 14/02; H04J 14/0227; H04J 14/0221; H04J 14/0212; H04J 14/0283; H04B 10/2503
See application file for complete search history.

(56) References Cited

U.S. PATENT DOCUMENTS

| | | | | |
|---|---|---|---|---|
| 5,563,733 A | * | 10/1996 | Mitsuda | H01S 3/06754 359/337.1 |
| 5,815,308 A | * | 9/1998 | Kim | H01S 3/10023 359/334 |
| 2002/0027472 A1 | * | 3/2002 | Lee | H04B 10/2504 330/4.5 |

* cited by examiner

*Primary Examiner* — Ted Wang
(74) *Attorney, Agent, or Firm* — Teitelbaum & MacLean; Neil Teitelbaum

(57) ABSTRACT

A bidirectional optical amplifier amplifies optical signals having signal wavelength and signal power input from two directions. The amplifier is arranged so that two counter-propagating signals pass through a first pumped rare earth doped pre-amplifier before passing through other amplifiers downstream. Optical circulators route the two counter propagating signals so that they both pass through in a counter-propagating manner through subsequent pumped rare earth doped amplifiers downstream.

9 Claims, 10 Drawing Sheets

| input signal | input power(dBm) | Gain (dB) | NF(dB) |
|---|---|---|---|
| 1529nm from Left | -15 | 15.5 | 10.2 |
| 1563nm from Left | -15 | 15.8 | 5.8 |
| 1529nm from Right | 0 | 15.5 | 4.9 |
| 1563nm from Right | 0 | 15.8 | 4.3 |

Fig. 2A

| input signal | input power(dBm) | Gain (dB) | NF(dB) |
|---|---|---|---|
| 1529nm from Left | -15 | 15.5 | 10.2 |
| 1563nm from Left | -15 | 15.8 | 5.8 |
| 1529nm from Right | 0 | 15.5 | 4.9 |
| 1563nm from Right | 0 | 15.8 | 4.3 |

Fig. 2B

| input signal | input power(dBm) | Gain (dB) | NF(dB) |
|---|---|---|---|
| 1529nm from Left | -15 | 15.2 | 5.7 |
| 1563nm from Left | -15 | 15.5 | 4.5 |
| 1529nm from Right | 0 | 15.2 | 4.2 |
| 1563nm from Right | 0 | 15.5 | 4.1 |

BIDIRECTIONAL AMPLIFIER

CROSS-REFERENCE TO RELATED APPLICATIONS

The present invention claims priority from U.S. Provisional Patent Application No. 62/308,301, filed Mar. 15, 2016, which is incorporated herein by reference.

TECHNICAL FIELD

The present invention relates to optical amplifiers, and in particular to low noise-figure (NF) bidirectional optical amplifiers and methods of suppressing the NF of bidirectional optical amplifiers.

BACKGROUND OF THE INVENTION

In a wavelength division multiplexing (WDM) optical transmission system, optical signals at a plurality of wavelengths are encoded with digital streams of information. These encoded optical signals, or optical channels, are combined together and transmitted through a series of spans of an optical fiber comprising a transmission link of a WDM fiber-optic network. At a receiver end of the transmission link, the optical channels are separated, whereby each optical channel can be detected by an optical receiver.

While propagating through an optical fiber, light tends to lose power. Yet some minimal level of optical channel power is required at the receiver end to decode information that has been encoded in an optical channel at the transmitter end. To boost optical signals propagating in an optical fiber, optical amplifiers are deployed at multiple locations, known as nodes, along the transmission link. The optical amplifiers extend the maximum possible length of the link, in some instances, from a few hundred kilometers to several thousand kilometers, by amplifying optical signals to power levels close to the original levels of optical power at the transmitter end.

An erbium-doped fiber amplifier (EDFA) is one of the most practical types of optical amplifiers employed in many modern fiber-optic networks. A single EDFA module can amplify up to about a hundred of optical channels at a time, thus providing significant cost savings.

It is well known that a bidirectional fiber optical communication system will have about 50% of cost saving, so a bidirectional optical amplifier is highly desired. Bidirectional optical amplifiers are also useful in making an amplifier array commonly known as an arrayed amplifier since a bidirectional amplifiers effectively function as two amplifiers.

Bidirectional optical fiber amplifiers are well known; they pass optical signals therethrough in two opposing or counter-propagating directions. In practice, what makes an EDFA not practicable in many DWDM systems is a very high input power dependent noise figure (NF). In instances where the input power from one direction in a bi-directional amplifier is much higher than the input power from the opposite direction, the NF of the signal with lower input power will be very high and often not acceptable.

SUMMARY OF THE INVENTION

In accordance with the invention a bidirectional optical amplifier is provided for amplifying optical signals having signal wavelength and signal power input from two directions, the optical amplifier having amplifier gain for the two directions, comprising:

optical gain mediums including a first optical gain medium doped with rare earth elements;

one or more optical pumps for pumping the optical gain mediums with pump light, whereby optical gain at the signal wavelength is created in the optical gain medium when the optical signals counter-propagate therethrough in the presence of pump light;

two optical circulators configured to direct two input beams through the first optical gain medium in opposite directions so that they counter-propagate through the first optical gain medium and configured to direct light amplified by the first optical gain medium to one or more other of the gain mediums from opposite directions after being amplified by the first optical gain medium.

In accordance with the invention there is further provided, a bidirectional optical amplifier having at a plurality of bi-directional amplifying stages, wherein one of the plurality of bi-directional amplifying stages is a bi-directional pre-amplifying stage having two ports, each port for receiving and transmitting light received from the other port, configured such that light passing through the pre-amplifying stage from either direction is first amplified by the pre-amplifying stage and subsequently amplified by a subsequent optical amplifier, or a plurality of optical amplifiers arranged in series, optically coupled to both ports of the pre-amplifying stage.

In accordance with another aspect of the invention there is provided, method of amplifying a first and a second optical signal so as to lessen a difference in noise-figure that would otherwise be associated with counter-propagating signals having a significantly different power levels through multiple series amplifying stages, comprising:

launching the first optical signal into a first end of an optical fiber having a first actively pumped span of rare earth doped optical fiber;

launching the second optical signal into a second end of the optical fiber and allowing the two signals to pass through the actively pumped span of rare earth doped optical fiber;

only after the first and second signal have been amplified by counter-propagating through the actively pumped span of erbium doped optical fiber, so as to be pre-amplified, counter-propagating the first and second pre-amplified signals through a second amplifying stage.

BRIEF DESCRIPTION OF THE DRAWINGS

Exemplary embodiments will now be described in conjunction with the drawings in which:

FIG. 2A Gain distribution along the fiber length.

FIG. 2B is the noise figure (NF) of prior-art bidirectional amplifier in the case that power of input signal from left end is higher than power from right end;

FIG. 4 is the NF of a bidirectional twin optical amplifier according to the present invention;

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1:
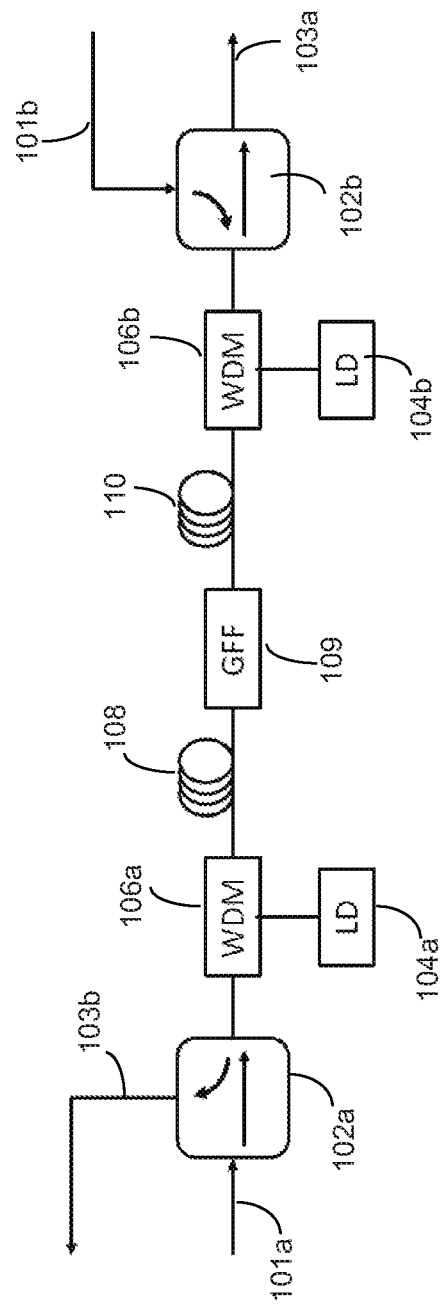
FIG. 1 is an optical schematic of the prior-art bidirectional amplifier.

Referring now to FIG. 1 a conventional bidirectional amplifier is shown having two optical circulators 102a and 102b having input ports 101a and 101b, and having output ports 103b and 103a respectively. Two rare earth doped spans of optical fiber 108 and 110, preferably erbium doped, are shown between the optical circulators and pumps 104a and 104b and WDM filters 106a and 106b allow pump light to be combined with signal light input into input ports 101a and 101b. A gain flattening filter 109 is disposed between the erbium-doped spans of optical fiber 108 and 110. The gain distribution along the erbium-doped fiber is highly dependent on the input power level of light launched into ports 101a and 101b. If the input power from the two sides of the optical circuit is essentially the same and the pump power is the same, the gain distribution along the fiber will be substantially symmetric. However, in the instance where input power from one end is significantly higher than input power from the other end, gain distribution along the fiber is mainly determined by the higher power signal and becomes similar to a unidirectional amplifier. This can be readily understood when referencing FIG. 2A, which illustrates the gain distribution where the input power from left end entering port 101a is higher than the input power from the right end entering port 101b. It is well known a signal having higher gain launched into an optical amplifier, results in lower noise figure (NF) at the output of the amplifier and conversely a signal having low gain launched into the optical amplifier results in an amplified signal with higher NF. This can be readily understood in FIG. 2B. Of course it is undesirable to have a high NF for signal with low power.

It is well known that a signal launched into an optical amplifier from the end having higher gain, will have lower noise figure (NF) at the output of the amplifier and conversely a signal launched into the optical amplifier from the end having low gain will have higher NF. This can be readily understood in FIGS. 2A and 2B. Of course it is undesirable to have a high NF for signal with low power.

Figure 3:
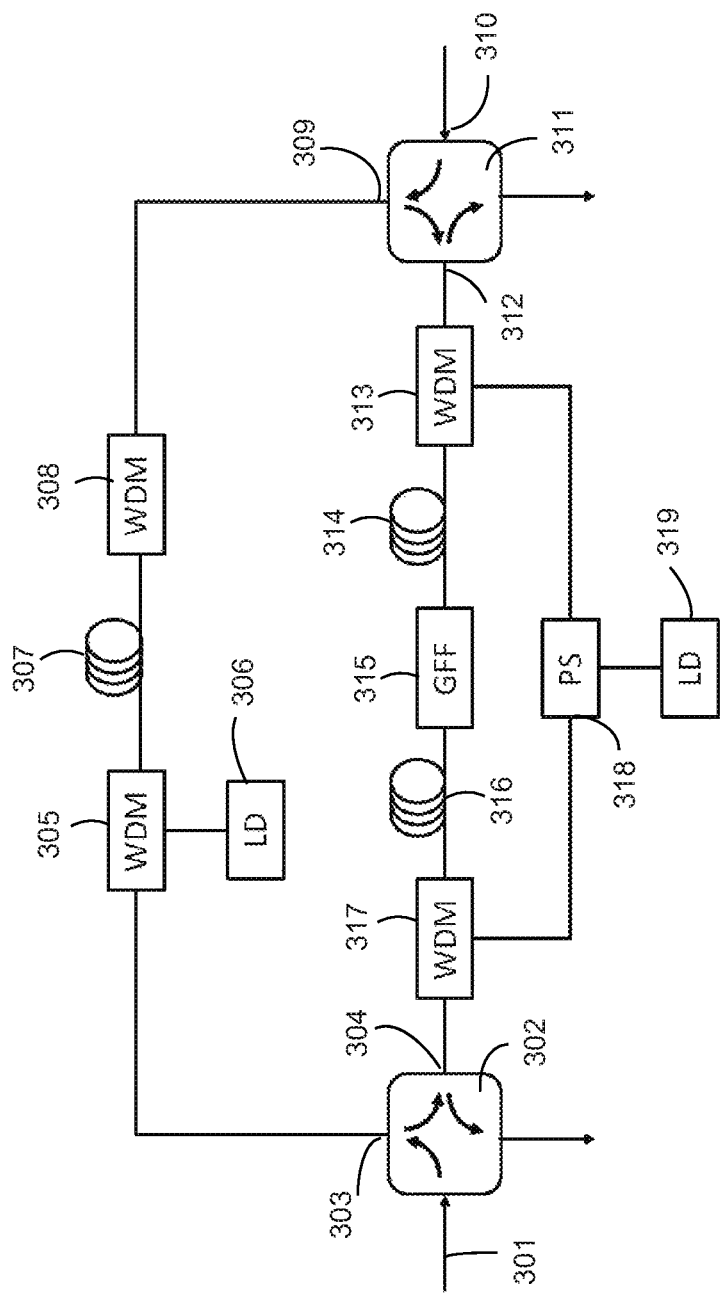
FIG. 3 is a block diagram of a bidirectional twin optical amplifier according to the present invention.

Referring now to FIG. 3, a block diagram of an optical amplifier of the present invention is shown. The optical amplifier is a cascading of two single-stage bidirectional amplifiers where the length of the erbium doped fiber between the two input ends is much shorter than shown in FIG. 1; it is easy to find from FIG. 2A that gain at beginning for both ends is high enough to achieve a low noise figure. In FIG. 3 light 301 is launched in to optical circulator 302 on a first port and simultaneously light 310 is launched into a first port of optical circulator 311 at an opposite end of the amplifier. In operation light circulates from port 1 of circulator 302 to port 2 shown as 303 and is directed to a short span of pumped erbium doped fiber 307 passing through WDM 305 and 308 on route to optical circulator 311. Co-propagating light 310 launched into optical circulator 311 is directed out of port 2 denoted as 309 and passes through WDM 308, EDFA 307 and WDM 305 entering port 303 of circulator 302. LD 306 provides pump light to amplify light passing through EDFA 307. Port 2 denoted as 304 of circulator 302 carries light 310 that was launched into circulator 311 and pre-amplified by EDFA 307 and this light traverses the lower branch consisting of WDM 317, EDFA 316, GFF 315, EDFA 314, WDM 313 and entering port 3 of optical circulator 311. Counter-propagating light traverses the same path arriving from the opposite direction. Pump light is generated at LD 319 is split at power-splitter (PS) 318 and is directed to WDM 317 and 313. Optical circulators 302 and 311 ensure that input signals at opposite ends of the amplifier are first pre-amplified by EDFA 307. This results in a similar noise figure for both signals regardless of their difference in power at input ends of the amplifier; then the pre-amplified signals are further amplified by 316 and 314. The length of the short span of doped ED fiber should preferably be less than 4 meters relative to an EDF doped density of about 7 dB/m absorption. Alternatively, the length can be described as short enough to make the gain of the pre-amplifying stage less than 10 dB even with a saturation pump.

FIG. 4 is a table illustrating the Gain (dB) and NF (dB) of the input signals.

Figure 5:
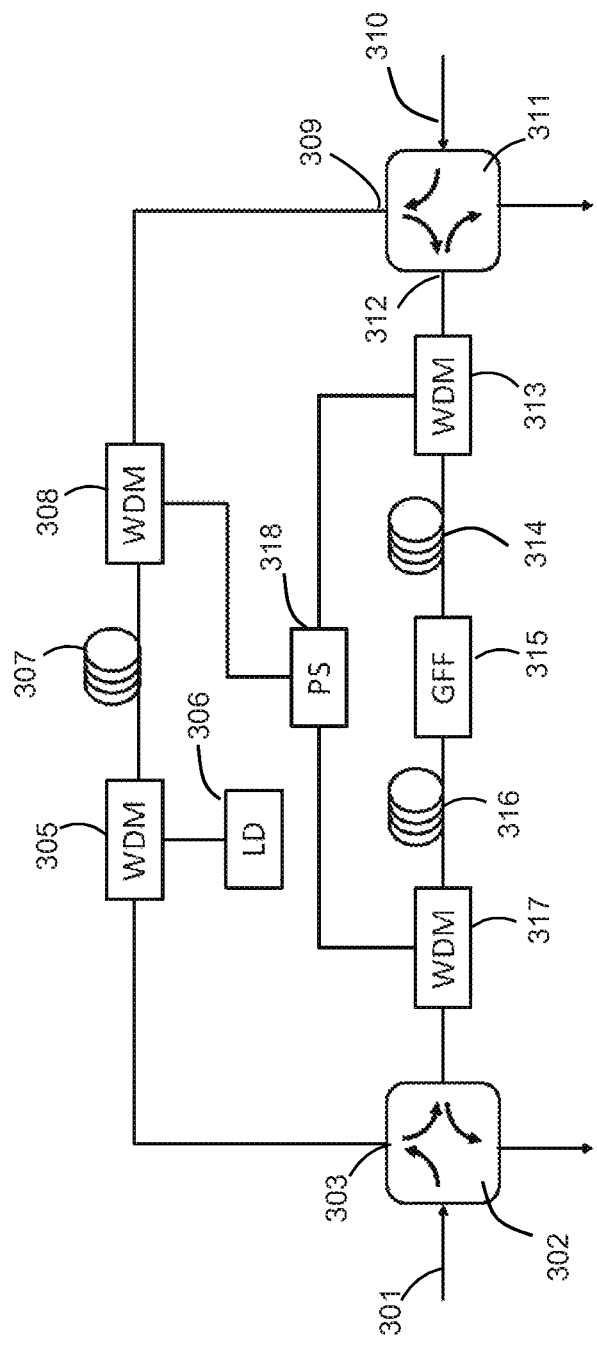
FIG. 5 is another block diagram of a bidirectional twin optical amplifier according to the present invention.

Referring now to FIG. 5, an amplifier similar to that of FIG. 3 is shown having a more economical pumping scheme. WDM 308 provides a means to tap off excess unabsorbed 980 nm pump light and provides this light to a 50:50 power splitter 318. WDMs 317 and 313 receive the pump light from the power splitter 318 and multiplex the pump light with incoming signal light to excite the two EDFAs 314 and 316 so that the signal light is amplified. Circulators 310 and 302 work in a similar manner as 310 and 302 described above.

Figure 6:
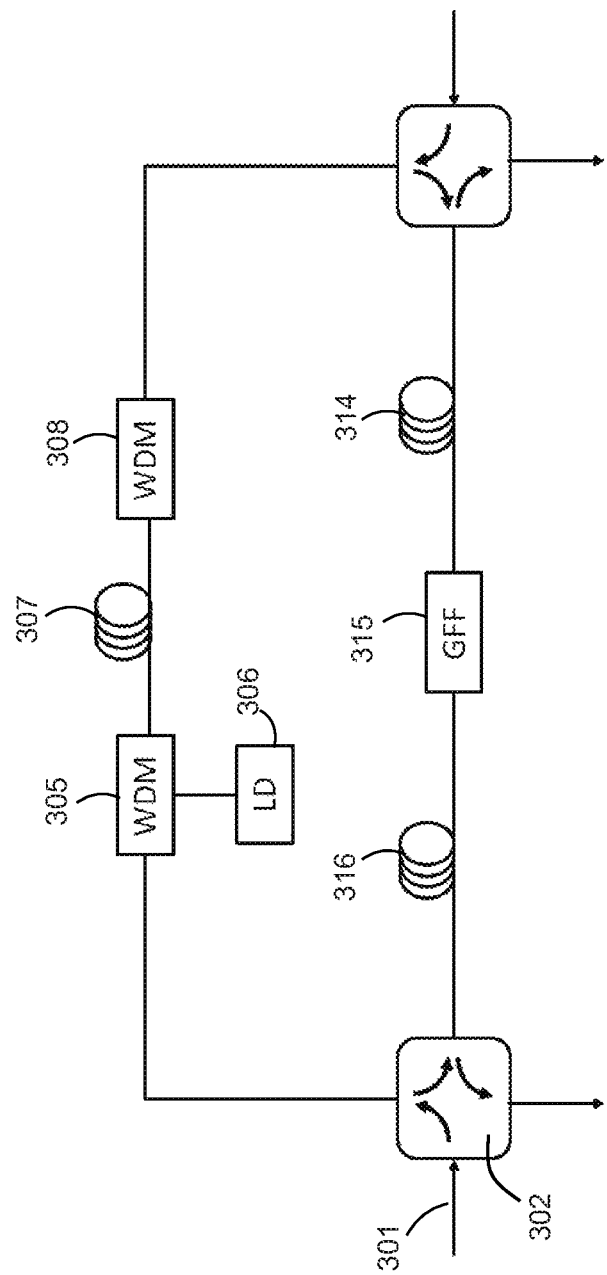
FIG. 6 is another block diagram of a bidirectional twin optical amplifier according to the present invention.

FIG. 6 shows alternative embodiment wherein the lower branch, which includes EDFAs 313, and 314 are absent pumps shown in FIG. 3. In FIG. 6, the EDFs in lower branch are not pumped. Typically there is almost always some un-pumped region at output end of a pumped erbium doped fiber. However in the very short length of EDF 307, this may not be the case, as is shown in FIG. 5. However, in FIG. 6 the un-pumped erbium doped fiber lengths serve to balance the gain spectrum, thereby making the gain of higher than the lower wavelengths being amplified. Because the un-pumped EDFs 316 and 314 absorb shorter wavelengths and amplify longer wavelengths the gain is substantially balanced.

Figure 7:
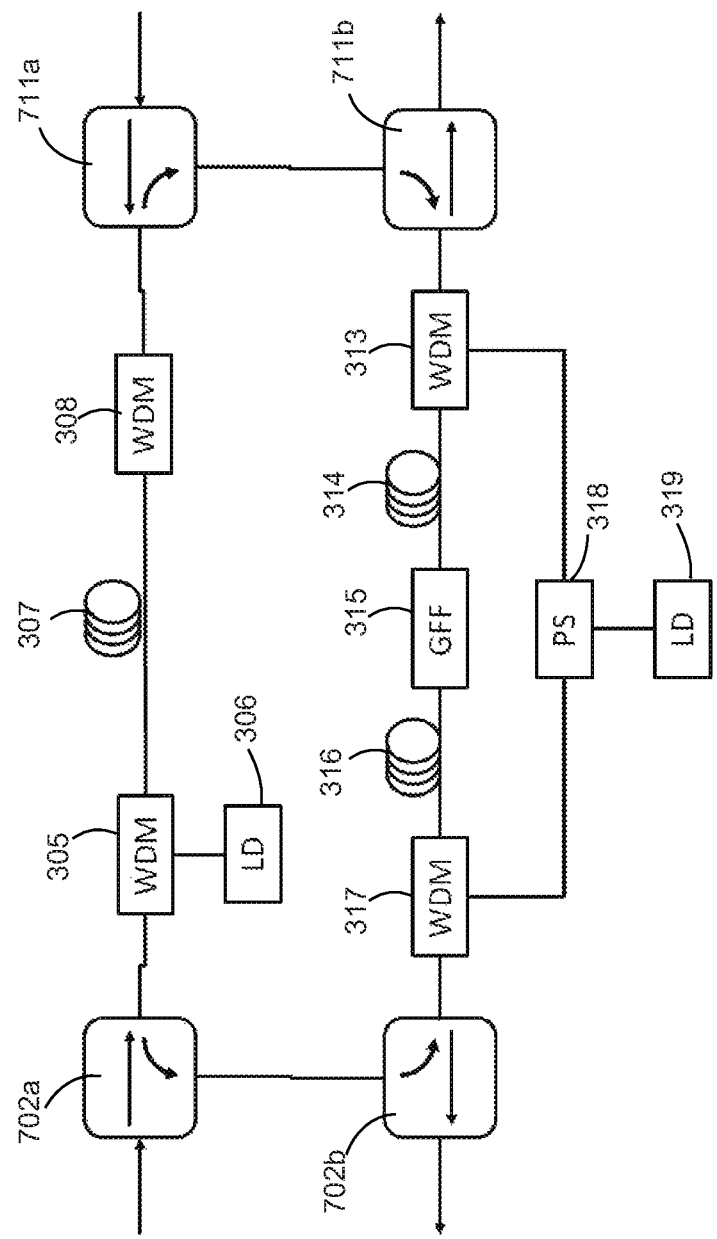
FIG. 7 is another block diagram of a bidirectional twin optical amplifier according to the present invention.

Referring now to FIG. 7 a bidirectional EDFA similar to that of FIG. 3 is shown. The difference however is that the two 4-port circulators 302 and 311 shown in FIG. 3 have been replaced with four, 3-port circulators 702a, 702b, 711a and 711b.

Figure 8:
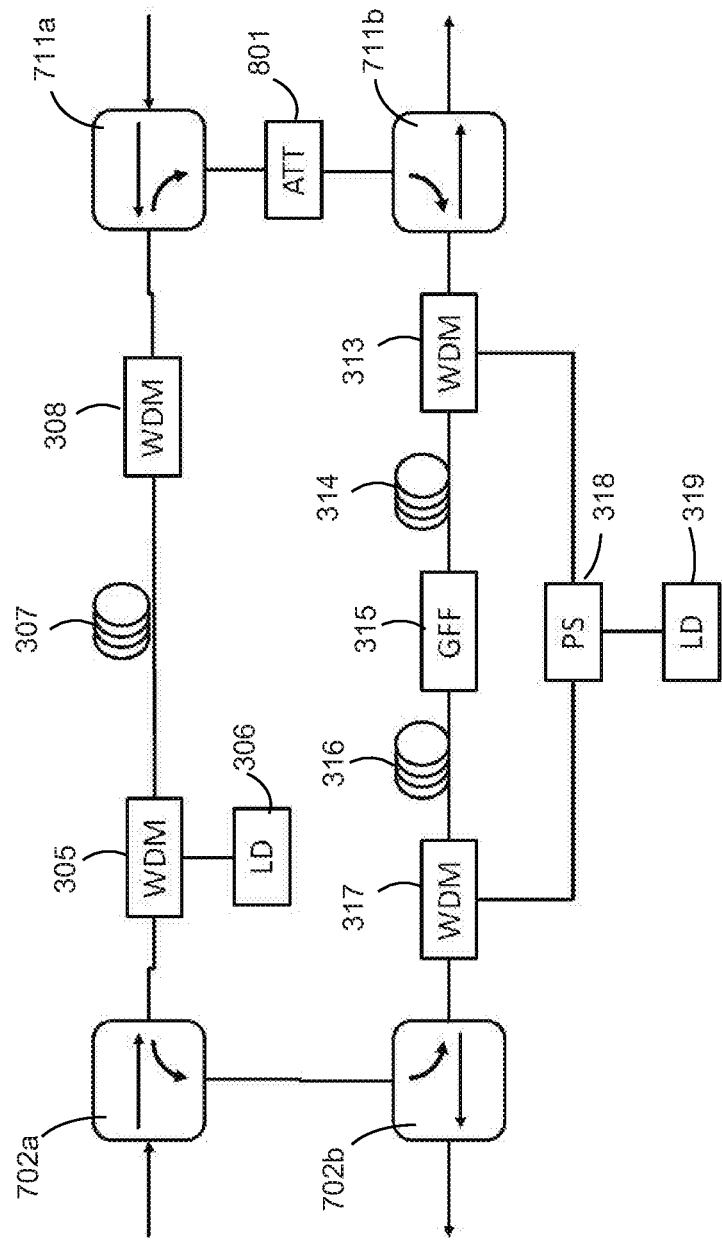
FIG. 8 is another block diagram of a bidirectional twin optical amplifier according to the present invention; Gain for the two directions can be different; and, FIG. 9 is another block diagram of a bidirectional twin optical amplifier according to the present invention; Gain for the two directions can be different.

FIG. 8 shows a modification to FIG. 7 wherein an attenuator 801 is disposed between the 3-port circulators 711a and 711b. In operation only the signal entering the amplifier at the input port of 702a becomes attenuated. This would be used in a situation where there was pre-knowledge that that input signal required attenuation.

Figure 9:
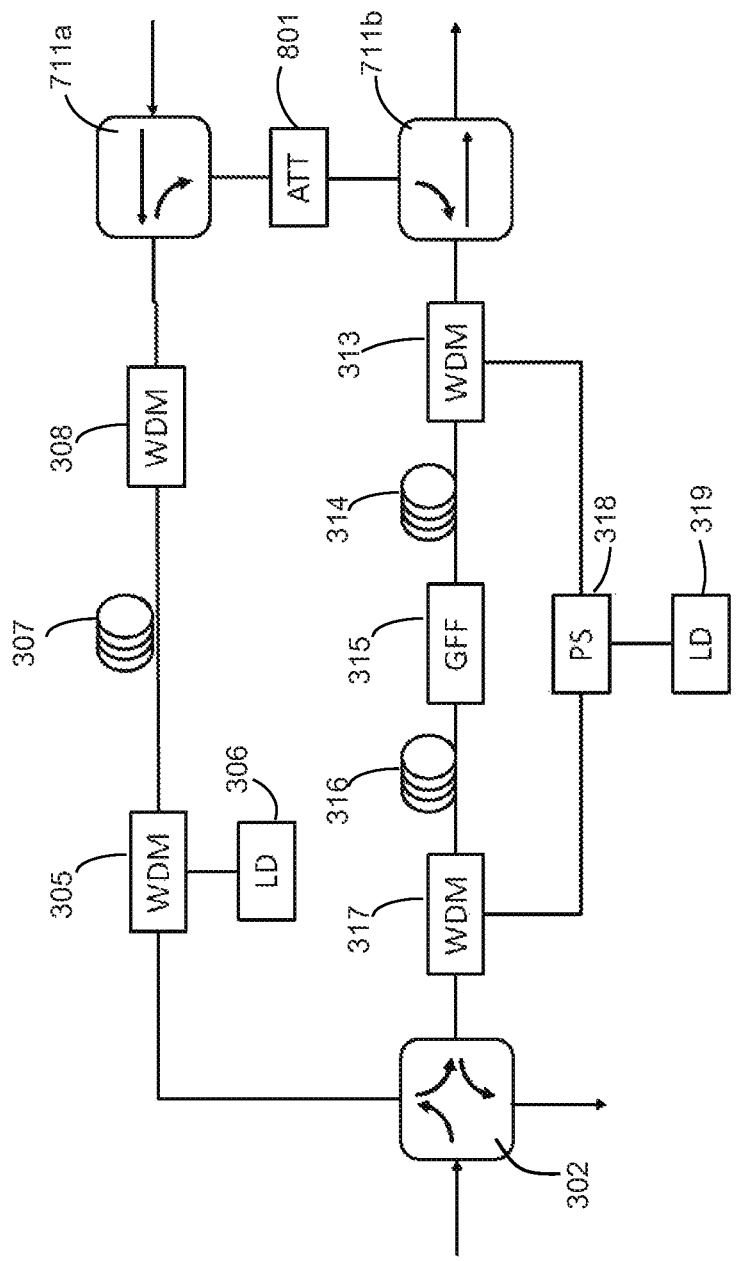

FIG. 9 is an illustration of an embodiment, which is similar to FIG. 8, however a 4-port circulator 302 is used with two 2-port circulators 711a and 711b.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of amplifying a first and a second optical signal so as to lessen a difference in noise-figure that would otherwise be associated with counter-propagating signals having a significantly different power levels through multiple series amplifying stages, comprising:

launching the first optical signal into a first end of an optical fiber having a first actively pumped span of rare earth doped optical fiber;

launching the second optical signal into a second end of the optical fiber and allowing the two signals to pass through the actively pumped span of rare earth doped optical fiber;

only after the first and second signal have been amplified by counter-propagating through the actively pumped span of erbium doped optical fiber, so as to be pre-amplified, counter-propagating the first and second pre-amplified signals through a second amplifying stage.

2. A method as defined in claim 1, wherein the first and second signals are launched into the optical fiber having a first actively pumped span of rare earth doped optical fiber simultaneously.

3. A method as defined in claim 2 wherein the actively pumped span of rare-earth doped fiber is shorter than an actively pumped span of rare-earth doped fiber within the second amplifying stage.

4. A method as defined in claim 2 wherein a circulator is provided to allow the preamplified signals that have passed through the first actively pumped span of rare-earth doped fiber to circulate and pass through the second amplifying stage.

5. A method as defined in claim 4, wherein the gain of the first and second optical signals is unequal after passing through the amplifiers.

6. An optical amplifier for receiving a first and a second optical signal so as to lessen a difference in noise-figure that would otherwise be associated with counter-propagating signals having a significantly different power levels through multiple series amplifying stages, comprising:

a rare earth doped span of optical fibre having a first end for receiving the first optical signal and having a second end for receiving the second optical signal so that they can counter-propagate as they pass through the rare earth doped span of optical fiber;

a pump for pumping the rare earth doped span of optical fiber when the counter-propagating signals pass therethrough and for pre-amplifying them; and, a second stage amplifier for receiving the pre-amplified first and second signals for allowing them to counter-propagate therethrough only after they have passed through the rare earth doped span of optical fiber.

7. An optical amplifier as defined in claim 6, wherein the actively pumped span of rare-earth doped fiber is shorter than an actively pumped span of rare-earth doped fiber within the second amplifying stage.

8. An optical amplifier as defined in claim 7 wherein a circulator is provided to allow preamplified signals that have passed through the first actively pumped span of rare-earth doped fiber to circulate and pass through the second amplifying stage.

9. An optical amplifier as defined in claim 6, wherein the gain of the first and second optical signals is unequal after passing through the amplifiers.

* * * * *